United States Patent
Satoh

[11] Patent Number: 6,091,535
[45] Date of Patent: Jul. 18, 2000

[54] OPTICAL TRANSMITTER AND OPTICAL TRANSMISSION SYSTEM WITH SWITCHABLE CHIRP POLARITY

[75] Inventor: Hideaki Satoh, Tokyo, Japan

[73] Assignee: Oki Electric Industry Co., Ltd., Tokyo, Japan

[21] Appl. No.: 09/221,156

[22] Filed: Dec. 28, 1998

[30] Foreign Application Priority Data

Jun. 29, 1998 [JP] Japan ................................ 10-182104

[51] Int. Cl.[7] .......................... G02B 26/00; G02F 1/01; G02F 1/035; H04B 10/04
[52] U.S. Cl. ...................... 359/239; 359/181; 359/187; 385/2; 385/3
[58] Field of Search ............... 385/2, 3; 359/239, 359/181, 187

[56] References Cited

U.S. PATENT DOCUMENTS 5,408,544  4/1995  Seino ........................................ 385/3
5,778,113  7/1998  Yu ............................................. 385/3

FOREIGN PATENT DOCUMENTS

61-294376  12/1986  Japan .

*Primary Examiner*—Georgia Epps
*Assistant Examiner*—Adrianne Riviere
*Attorney, Agent, or Firm*—Wenderoth, Lind & Ponack, L.L.P.

[57] ABSTRACT

An optical transmitter has a Mach-Zehnder modulator, and a feedback loop that controls the bias voltage supplied to the modulator according to the insertion loss of the modulator, to compensate for DC drift in the attenuation characteristic of the modulator. The feedback loop can be switched to provide negative feedback on either the positive or negative slope of the attenuation characteristic. Switching the slope switches the polarity of the chirp generated by the modulator, enabling positive or negative chirp to be selected, whichever produces the least dispersion penalty. Since switching the slope also switches the polarity of the modulated signal, an optical transmission system using this optical transmitter has an additional circuit that selectively inverts the transmitted or received signal.

13 Claims, 9 Drawing Sheets

OPTICAL TRANSMITTER AND OPTICAL TRANSMISSION SYSTEM WITH SWITCHABLE CHIRP POLARITY

BACKGROUND OF THE INVENTION

The present invention relates to an optical transmitter and an optical transmission system.

Single-mode optical fiber is widely used for long-haul transmission in telecommunication systems. The Telecommunication Standardization Sector of the International Telecommunications Union (ITU-T) has set standards for two types of single-mode optical fiber. One type is described in ITU-T recommendation G.652, entitled Characteristics of a Single-Mode Optical Fibre Cable. The other type is described in ITU-T recommendation G.653, entitled Characteristics of a Dispersion-Shifted Single-Mode Optical Fibre Cable. Dispersion refers to chromatic dispersion of light pulses due to the different propagation speeds of different wavelengths. G.652 fiber has a zero-dispersion wavelength in the 1.3-$\mu$m wavelength band. The zero-dispersion wavelength of G.653 fiber is located in the 1.5-$\mu$m wavelength band, which has minimum attenuation loss.

Although the optical signals transmitted through these optical fibers can be generated by on-off modulation of a laser light source, there is a problem of wavelength shift, referred to as chirp, when the laser is modulated in this way. This problem can be largely overcome by operating the laser light source at a constant output level, and modulating the laser light externally.

One type of external modulator comprises a Mach-Zehnder interferometer fabricated in a lithium-niobate substrate. This type of device, referred to as a Mach-Zehnder lithium-niobate modulator, or simply as a lithium-niobate modulator, is capable of operating at very high speeds with relatively little chirp, enabling high-bit-rate transmission over long distances. However, there is a problem in that the attenuation characteristic of a lithium-niobate modulator changes slowly over time, but this problem, known as DC drift, can be overcome with a feedback loop that adjusts the bias voltage applied to the modulator. Lithium-niobate modulators are currently used in, for example, optical transmission systems operating at ten gigabits per second (10 Gb/s).

Although a lithium-niobate modulator has low chirp, the chirp is not necessarily zero, and zero chirp is not necessarily desirable. When optical signals with a center wavelength of 1.5 $\mu$m are transmitted through G.652 fiber, for example, the dispersion penalty can be reduced if the optical modulator imparts a negative or blue chirp to the transmitted light pulses. When the same optical signals are transmitted through G.653 fiber, a small positive or red chirp may slightly reduce the dispersion penalty.

Conversely, light pulses with a 1.5-$\mu$m center wavelength and positive chirp are severely broadened by transmission through G.652 fiber, while light pulses with a 1.5-$\mu$m center wavelength and negative chirp are overly compressed by transmission through G.653 fiber. To avoid these types of signal distortion, it would be convenient if an optical modulator could be switched between positive and negative chirp, depending on the type of optical fiber employed and the transmission wavelength, but conventional lithium-niobate modulators provide no way of switching the chirp polarity.

SUMMARY OF THE INVENTION

A general object of the present invention is to avoid signal distortion in optical transmission systems.

A more particular object is to provide an optical transmitter that can be switched between positive chirp and negative chirp.

The invented optical transmitter has a light source, a Mach-Zehnder modulator, a driver circuit, a first photodetector, a second photodetector, a feedback circuit, and a switching circuit.

The light source generates an unmodulated optical signal, which is modulated by the Mach-Zehnder modulator according to a driving signal and a bias voltage. The modulated optical signal has a chirp. The chirp polarity depends on the bias voltage.

The driver circuit generates the driving signal from an electrical input signal. The first photodetector monitors the average power of the modulated optical signal. The second photodetector monitors the power of the unmodulated optical signal. The feedback circuit controls the bias voltage according to the average power of the modulated optical signal and the power of the unmodulated signal.

The feedback circuit operates in a first mode in which the bias voltage increases when the average power of the modulated signal increases in relation to the power of the unmodulated signal, and in a second mode in which the bias voltage decreases when the average power of the modulated signal increases in relation to the power of the unmodulated signal. The switching circuit switches the feedback circuit between the first mode and the second mode, thereby switching the chirp polarity. In both modes, the feedback circuit compensates for DC drift in the attenuation characteristic of the Mach-Zehnder modulator.

DETAILED DESCRIPTION OF THE INVENTION

Embodiments of the invention will be described with reference to the attached drawings, in which like parts are represented by like reference characters.

Figure 1:
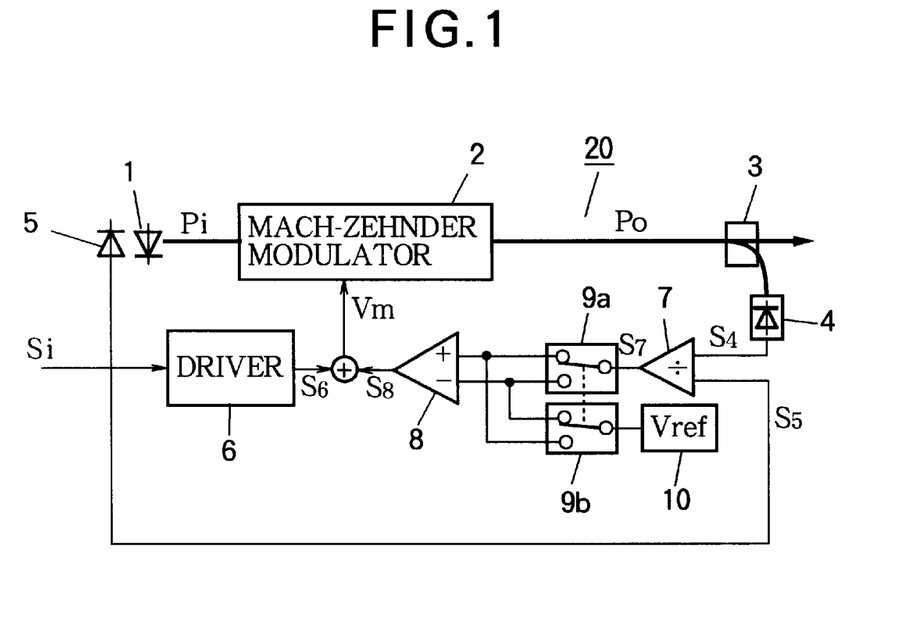
FIG. 1 is a schematic diagram of an optical transmitter illustrating a first embodiment of the invention.

Illustrating a first embodiment of the invention, FIG. 1 shows an optical transmitter 20 comprising a laser light source 1, a Mach-Zehnder modulator 2, an optical coupler 3, a first photodetector 4 that monitors an power of the optical signal Po output from the Mach-Zehnder modulator 2, a second photodetector 5 that monitors the power of an optical signal Pi input to the Mach-Zehnder modulator 2, a driver circuit 6 that drives the Mach-Zehnder modulator 2, a divider 7 that outputs a feedback signal $S_7$, an operational amplifier 8 that receives the feedback signal $S_7$ and a reference voltage Vref and generates a bias voltage signal $S_8$, a ganged pair of switches 9a and 9b that switch the inputs to the operational amplifier 8, and a reference voltage generator 10 that generates the reference voltage Vref. The Mach-Zehnder modulator 2 receives the summed output of the driver circuit 6 and the operational amplifier 8 as a modulating voltage Vm.

The laser light source 1 is a semiconductor diode laser such as a distributed feedback (DFB) laser emitting light of a specific wavelength from a front facet to the Mach-Zehnder modulator 2 and from a rear facet to the second photodetector 5.

Figure 2:
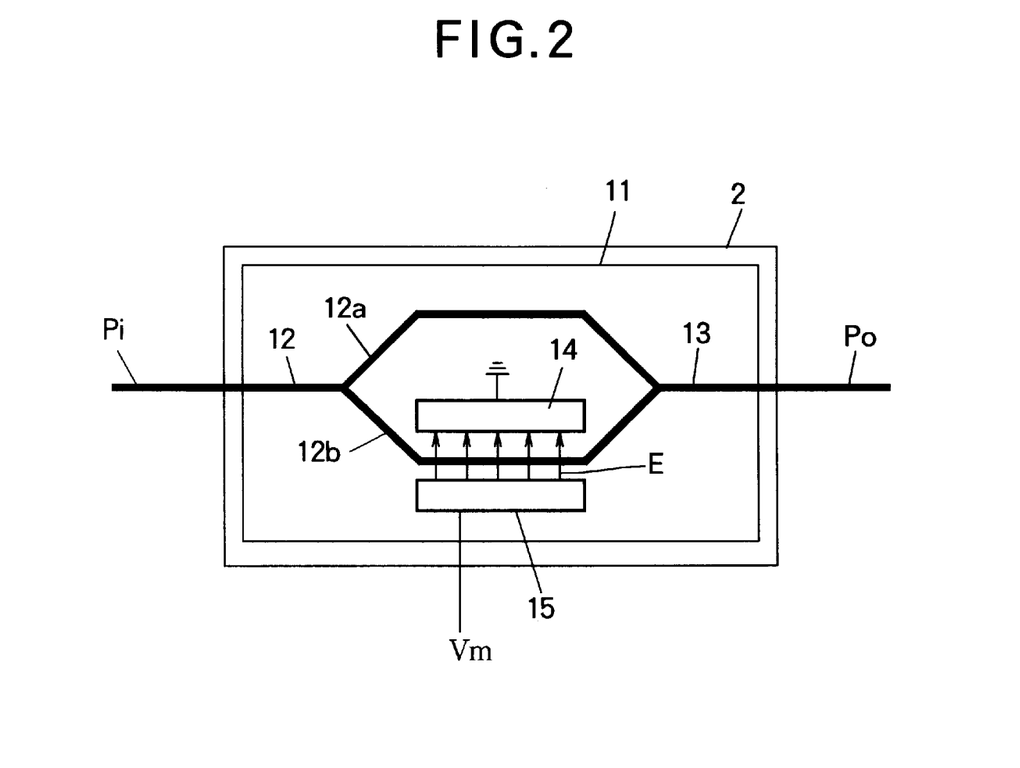
FIG. 2 is a more detailed plan view of the modulator in FIG. 1.

The Mach-Zehnder modulator 2 is a lithium-niobate modulator of the type shown in FIG. 2, comprising a lithium-niobate (LiNbO₃) substrate 11 in which an input waveguide 12 and an output waveguide 13 are formed. The input waveguide 12 branches into two arms 12a and 12b, which rejoin at the output waveguide 13, forming a Mach-Zehnder interferometer. Arm 12b passes between a pair of electrodes 14 and 15. Electrode 14 is coupled to ground, while electrode 15 receives the modulating voltage Vm. An electric field E between electrodes 14 and 15 alters the refractive index of waveguide arm 12b, thereby altering the propagation speed of light in arm 12b. The modulating voltage Vm thus controls the phase of the light emerging from arm 12b, so that this light interferes to a controlled degree with the light from the other arm 12a. The modulating voltage Vm thereby modulates the intensity or power of the light leaving the Mach-Zehnder modulator 2.

Referring again to FIG. 1, the optical coupler 3 is coupled to the Mach-Zehnder modulator 2, the first photodetector 4, and to an optical transmission fiber in an optical communication system. The optical coupler 3 diverts a fixed proportion of the power of the optical output Po of the Mach-Zehnder modulator 2 to the first photodetector 4, and supplies the rest to the optical transmission fiber.

The first photodetector 4 (e.g. a photodiode) converts the optical signal received from the optical coupler 3 to an electrical signal $S_4$ for input to the divider 7. The response speed of the first photodetector 4 is slower than the modulation rate of the optical signal, so the electrical signal S4 represents the average power of the optical signal, rather than the power of individual pulses in the signal.

The second photodetector 5 receives the optical signal emitted from the rear facet of the laser light source 1. The power of this signal is proportional to the power of the optical input Pi to the Mach-Zehnder modulator 2. The second photodetector 5 converts the received optical signal to an electrical signal $S_5$, which is also supplied to the divider 7.

The driver circuit 6 receives an electrical input signal Si with high and low logic levels, coded so that the high and low logic levels occur with equal frequency. The driver circuit 6 amplifies the electrical input signal Si to provide a driving signal $S_6$ with the proper voltage swing for driving the Mach-Zehnder modulator 2.

The divider 7 is a comparison circuit that compares the outputs $S_4$ and $S_5$ of the first and second photodetectors to determine the insertion loss of the Mach-Zehnder modulator 2. The feedback signal $S_7$ represents $S_4$ divided by $S_5$.

The operational amplifier 8 has inverting (−) and non-inverting (+) input terminals. The feedback signal $S_7$ is supplied to one of the two input terminals, and the reference voltage Vref to the other input terminal. Switches 9a and 9b determine which input signal is supplied to which input terminal.

The bias voltage signal $S_8$ provides a bias voltage to the Mach-Zehnder modulator 2. The first photodetector 4, divider 7, and operational amplifier 8 form a feedback loop that controls the bias voltage so that the two inputs $S_7$ and Vref to the operational amplifier 8 remain substantially equal. The switches 9a and 9b control the polarity of the feedback loop.

Next, the modulation operation of the first embodiment will be described.

Figure 3:
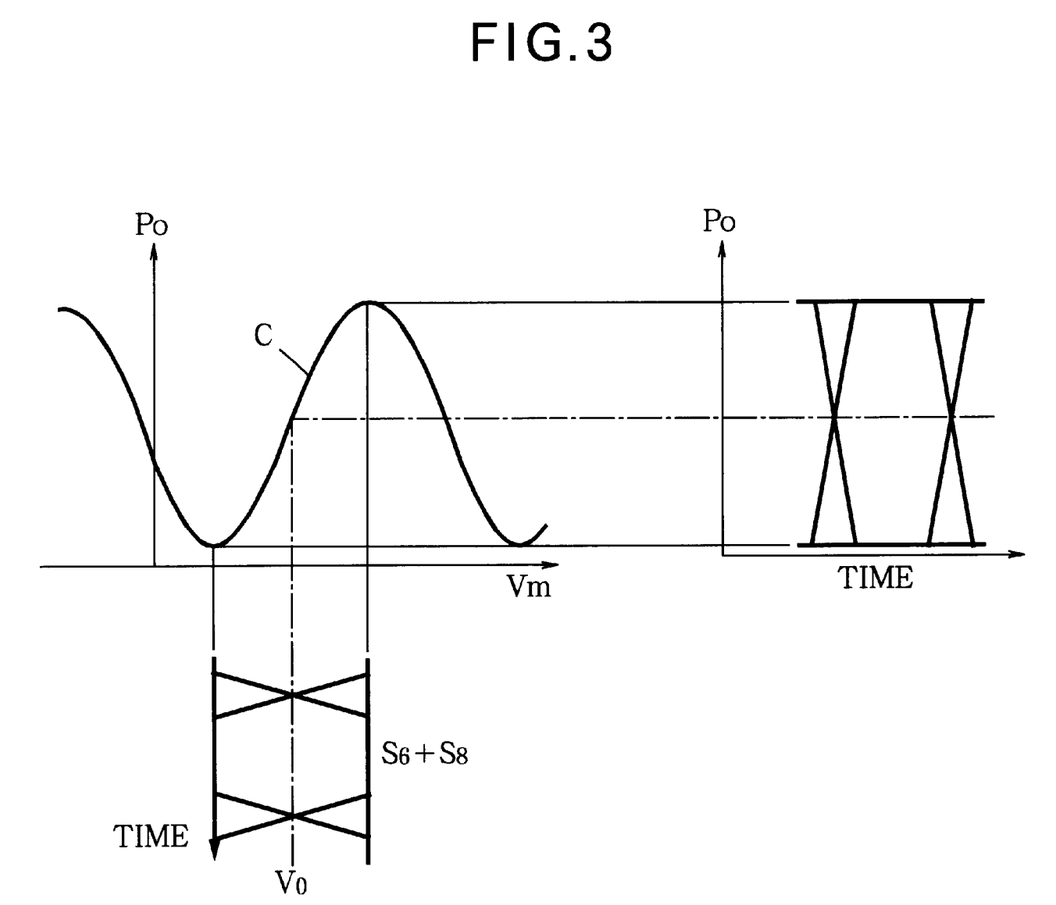
FIG. 3 is a graph illustrating the attenuation characteristic of the modulator in FIG. 2.

FIG. 3 illustrates the principle of operation of the Mach-Zehnder modulator 2. Curve C is the attenuation characteristic of the Mach-Zehnder modulator 2, showing how the intensity of the optical output Po depends on the modulating voltage Vm. Since the output intensity depends on a phase relationship, the attenuation characteristic C is a periodic function. The driver circuit 6 provides the driving signal $S_6$ with a voltage swing equal to one half-period of the attenuation characteristic C. The bias voltage $S_8$ sets the center point or operating point $V_0$ of the voltage swing. If the bias voltage $S_8$ is adjusted to set $V_0$ at the position shown, on the midpoint of the rising or positive slope of curve C, the optical output waveform (Po) matches the modulating waveform ($S_6+S_8$).

DC drift and the feedback operation of the first embodiment will be described next.

Figure 4:
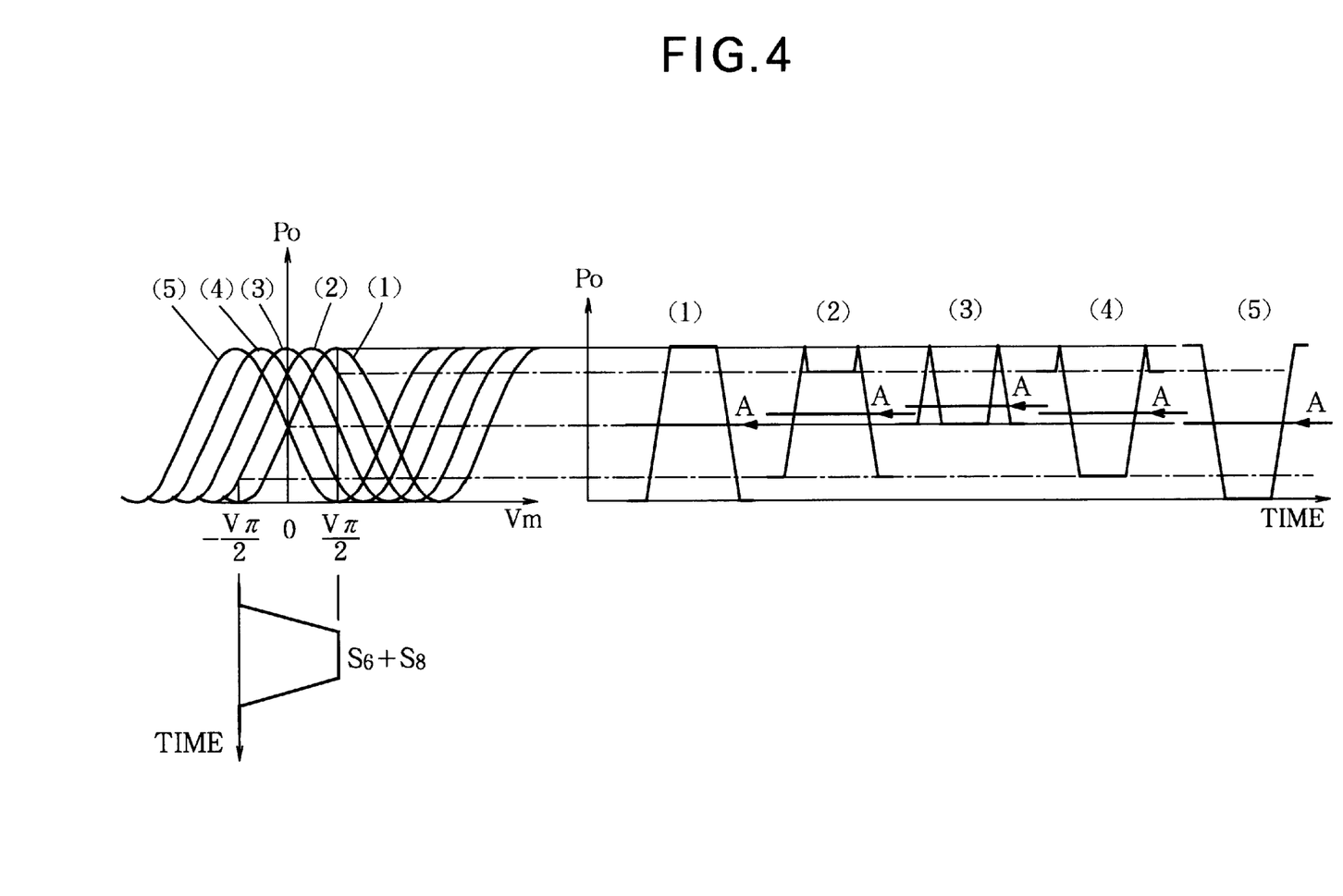
FIG. 4 is a graph illustrating DC drift in the modulator in FIG. 2.

FIG. 4 illustrates DC drift. With the passage of time, the attenuation characteristic of a Mach-Zehnder lithium-niobate modulator slowly drifts from position (1) toward position (5), where position (5) is located one half-period (Vπ) to the left of position (1). The drift distorts the output Po from the normal pulse waveform (1) to a vertically compressed pulse waveform (2) with spikes at the rising and falling edges, then to just a pair of spikes (3), and finally to a completely inverted waveform (5). The average optical output power of the pulse waveform, indicated by the arrows marked A, increases from position (1) to position (3), then decreases from position (3) to position (5).

At position (3), corresponding to a DC drift of Vπ/2, the output signal is so badly distorted that the high and low input levels are indistinguishable. At position (5), however, where the operating point is located at the midpoint of the falling or negative slope of the attenuation characteristic C, the output signal is undistorted, although its polarity is reversed. In the present invention, the Mach-Zehnder modulator 2 operates at either position (1) or position (5), depending on the setting of switches 9a and 9b, as explained next.

Figure 5:
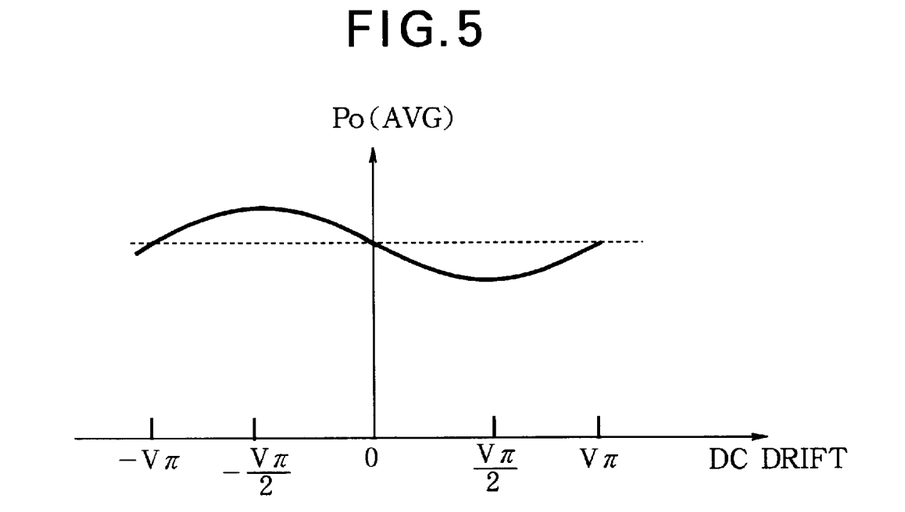
FIG. 5 is a graph illustrating the effect of DC drift on the average output power of the modulator in FIG. 2.

FIG. 5 plots the average power of the output optical pulse waveform (average Po, vertical axis) as a function of DC drift (horizontal axis) from the operating point set by the bias voltage $S_8$. This function is also periodic, with period 2Vπ.

Zero DC drift corresponds to position (1) in FIG. 4. The dotted horizontal line in FIG. 5 corresponds to an average optical power at which the feedback signal $S_7$ is substantially equal to the reference voltage Vref. The reference voltage Vref is selected so that this average power level is achieved at positions (1) and (5) in FIG. 4.

If switches 9a and 9b are set so that the output of the divider 7 is coupled to the inverting input terminal of the operational amplifier 8, then positive feedback operates on the positive slope of the curve in FIG. 5, where the absolute value of the DC drift exceeds $V\pi/2$, and negative feedback operates on the negative slope, where the absolute value of the DC drift is less than $V\pi/2$. If the Mach-Zehnder modulator 2 starts out operating on the positive slope, positive feedback quickly moves the operating point onto the negative slope; then negative feedback holds the operating point to the intersection of the negative slope with the dotted line, where the DC drift is zero. For example, a slight negative DC drift increases the average output power Po, causing the operational amplifier 8 to reduce the bias voltage and shift the operating point in the negative direction, thereby canceling the DC drift. Zero DC drift corresponds to position (1) in FIG. 4.

If switches 9a and 9b are set in the opposite way, so that the output of the divider 7 is coupled to the non-inverting input terminal of the operational amplifier 8, then positive feedback operates on the negative slope of the curve in FIG. 5, and negative feedback on the positive slope. In this case, feedback holds the operating point at a value such that the DC drift is equal to $-V\pi$ (or equivalently, to $V\pi$), corresponding to position (5) in FIG. 4. At this setting, the output optical waveform Po is inverted from the modulating waveform.

The feedback loop comprising the optical coupler 3, first photodetector 4, divider 7, and operational amplifier 8 thus operates at either switch setting, compensating for DC drift regardless of the output power level of the laser light source 1, fluctuations in this power level, or the pulse structure of the optical output signal, provided high and low pulses occur with equal frequency. When switches 9a and 9b are set as shown in FIG. 1, the polarity of the output signal Po is reversed, but this reversal can be compensated for at the transmitting or receiving end of the communication system, as will be described in succeeding embodiments.

Next, the chirping performance of the first embodiment will be described, starting with a brief description of chromatic dispersion in optical fibers.

Figure 6:
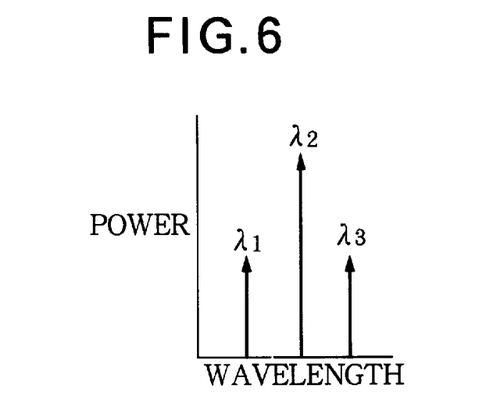
FIG. 6 is a graph showing three wavelengths in the spectrum of an optical signal.

Although the laser light source 1 has a narrow output spectrum, the spectral width is not zero. The output comprises a range of wavelengths including, for example, wavelengths $\lambda_1$, $\lambda_2$, and $\lambda_3$ in FIG. 6. It will be assumed below that the center wavelength $\lambda_2$ is equal to 1.5 $\mu$m.

Figure 7:
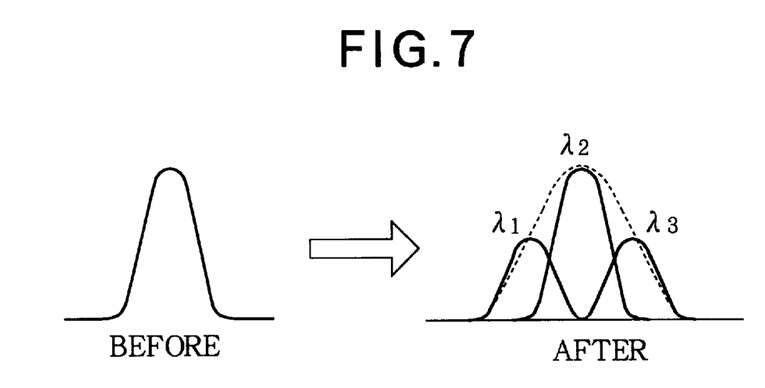
FIG. 7 is a graph illustrating chromatic dispersion of a pulse signal.

FIG. 7 shows an example of pulse waveforms before and after propagation through a G.652 optical fiber, in which wavelength $\lambda_1$, propagates slightly faster than wavelength $\lambda_2$, which propagates slightly faster than wavelength $\lambda_3$. Including components intermediate between these wavelengths, the received pulse has the broadened waveform indicated by the dotted line, and is chirped in that shorter wavelengths (e.g. $\lambda_1$) arrive before longer wavelengths (e.g. $\lambda_3$).

Figure 8A:
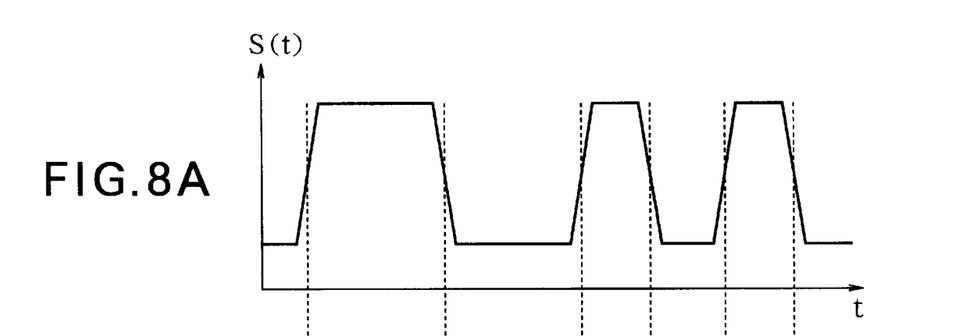
FIGS. 8A, 8B, and 8C illustrate positive and negative chirp.
Figure 8B:
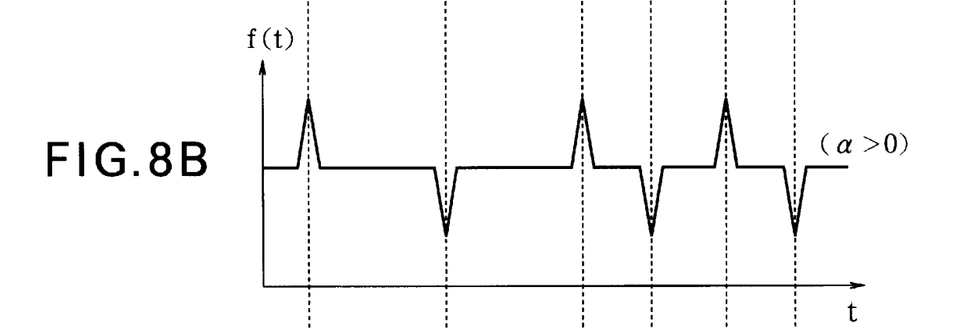
Figure 8C:
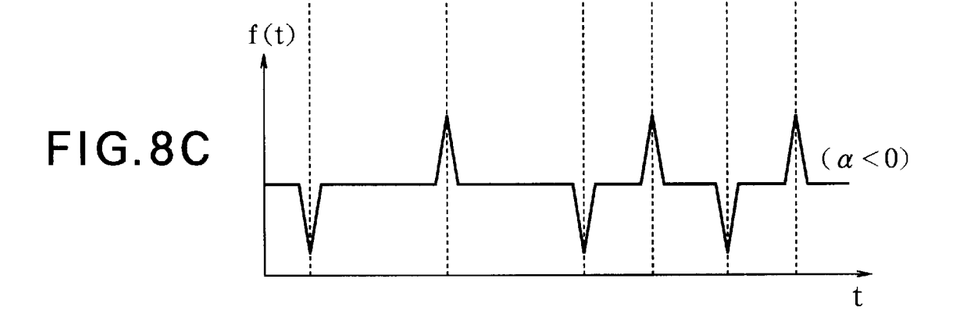

FIGS. 8A, 8B, and 8C illustrate the type of chirp generated in a Mach-Zehnder lithium-niobate modulator. FIG. 8A shows examples of optical pulse waveforms leaving the modulator, indicating time (t) on the horizontal axis and optical intensity S(t) on the vertical axis. FIGS. 8B and 8C illustrate chirp by showing time (t) on the horizontal axis and frequency f(t) on the vertical axis. FIG. 8B illustrates positive or red chirp, in which the optical frequency is shifted in the high-frequency (blue) direction at the rising edge of each pulse, and in the low-frequency (red) direction at the falling edge of the pulse. FIG. 8C illustrates negative or blue chirp. The frequency shifts occur only during the rise and fall of the pulse signal.

Mathematically, the chirp is described by the following equation, in which $\alpha$ is the chirp parameter and $\Delta f$ is the frequency shift.

$$\Delta f = \frac{\alpha}{4\pi} \frac{1}{S(t)} \frac{dS(t)}{dt}$$

Figure 9:
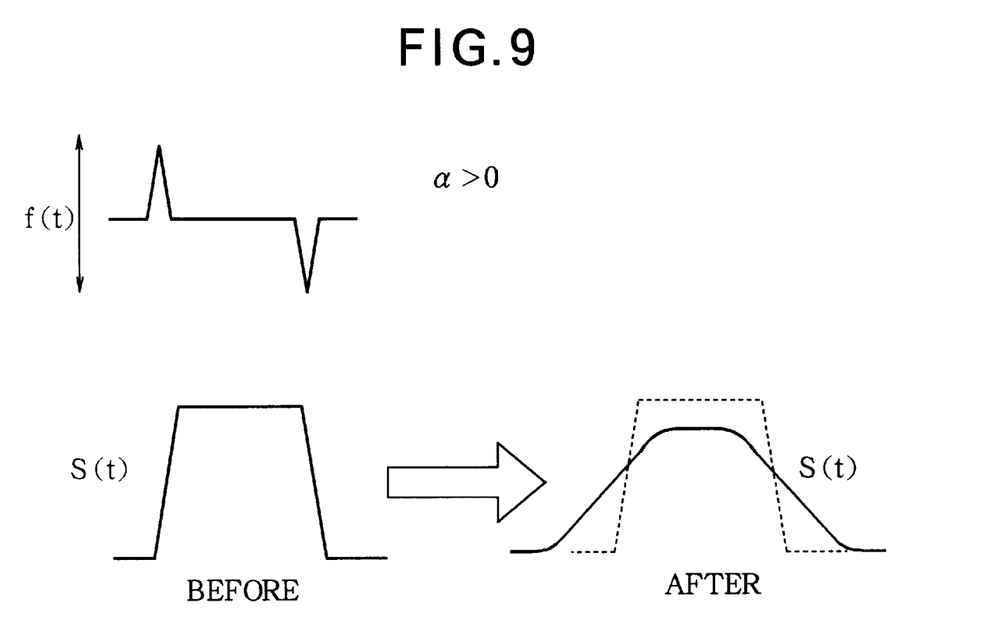
FIG. 9 illustrates pulse waveform distortion caused by positive chirp.

FIG. 9 shows the effect of transmitting a positively chirped pulse though an optical fiber in which short wavelengths (high frequencies) propagate more rapidly than long wavelengths (low frequencies), showing the frequency profile f(t) and intensity profile S(t) of the pulse before entering the fiber, and the intensity profile S(t) of the pulse after leaving the fiber. The transmission through the fiber broadens the pulse.

Figure 10:
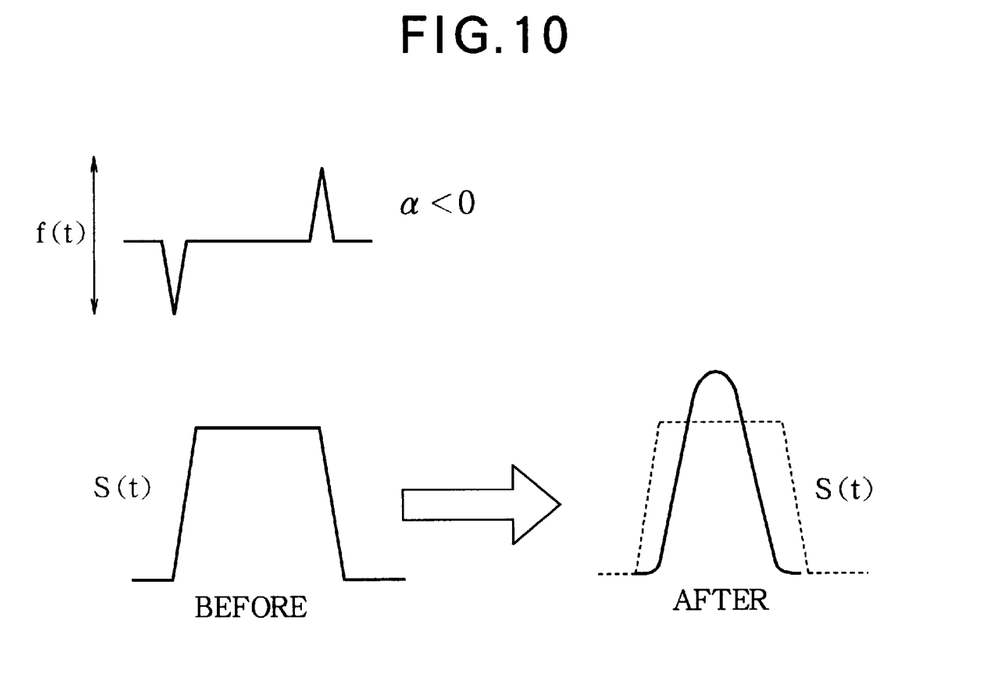
FIG. 10 illustrates pulse waveform distortion caused by negative chirp.

FIG. 10 shows the effect of transmitting a negatively chirped pulse through the same optical fiber, again showing f(t) and S(t) before the pulse enters the fiber and S(t) after the pulse leaves the fiber. This time the transmission through the fiber compresses the pulse.

If the modulator and the fiber both produce the same type of chirp, the pulse waveform that emerges from the fiber can be badly distorted. If the modulator and fiber produce opposite types of chirp, however, then the chirp due to the modulator can compensate for the chirp produced in the fiber, so that the pulse emerges relatively undistorted. The dispersion penalty of an optical transmission system thus depends on the chirp parameter a of the modulator.

Figure 11:
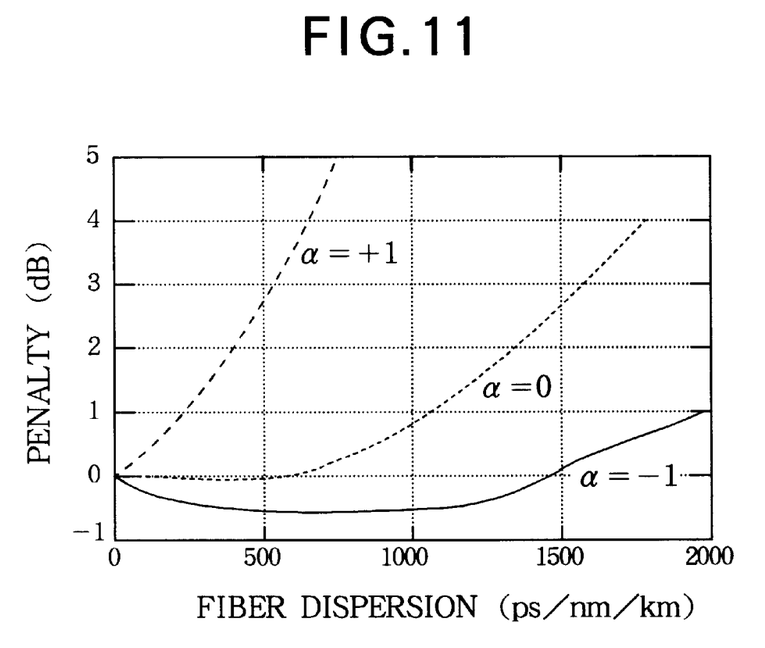
FIG. 11 is a graph showing the dispersion penalty in G.652 fiber at a 1.5-$\mu$m wavelength with positive, negative, and zero chirp.

FIG. 11 illustrates this dependence for G.652 optical fiber at the 1.5-$\mu$m wavelength. Fiber dispersion in picoseconds of arrival time per nanometer of wavelength per kilometer of transmission distance (ps/nm/km) is shown on the horizontal axis. The dispersion penalty is indicated in decibels (dB) on the vertical axis. The best result is obtained when the modulator's chirp parameter $\alpha$ is from about −0.5 to about −1.0.

Figure 12:
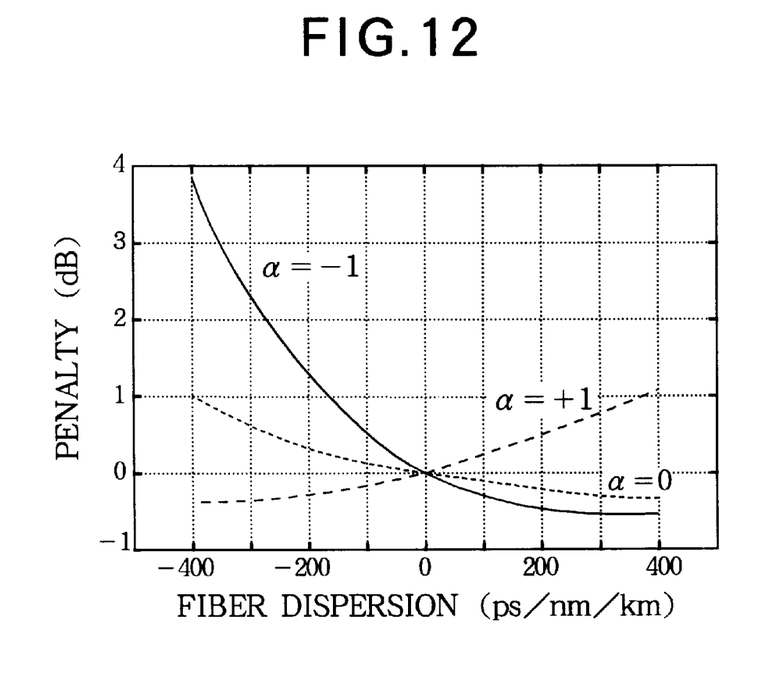
FIG. 12 is a graph showing the dispersion penalty in G.653 fiber at a 1.5-$\mu$m wavelength with positive, negative, and zero chirp.

FIG. 12 illustrates the same dependence for G.653 optical fiber at the same 1.5 $\mu$m wavelength. The best result is obtained is now obtained when the modulator's chirp parameter a is from about 0.0 to about +0.5.

Figure 13:
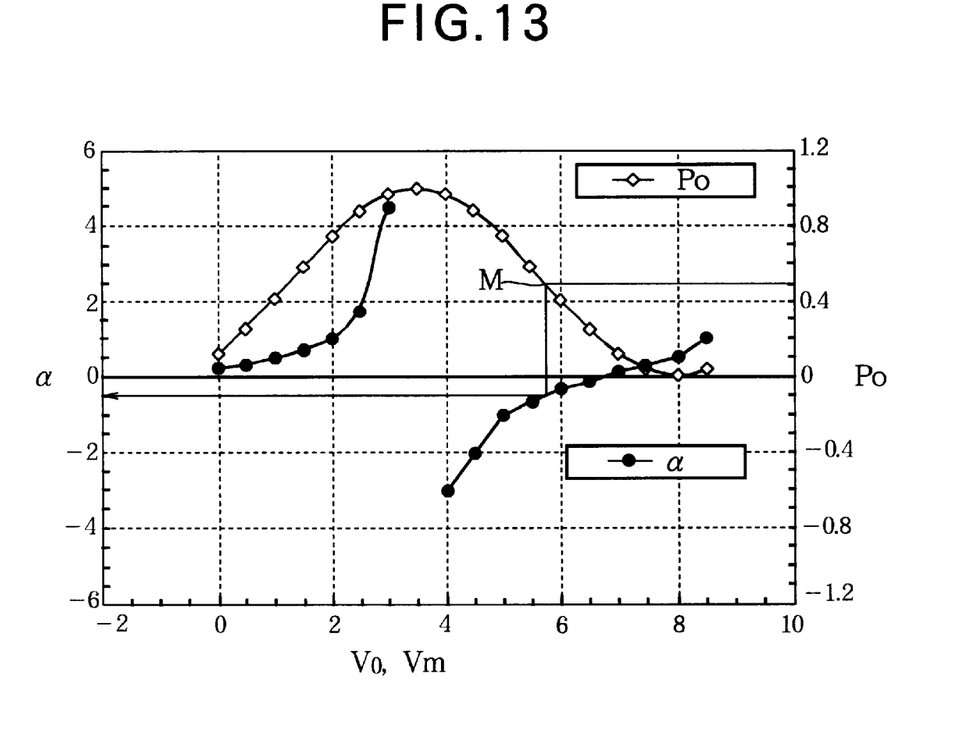
FIG. 13 is a graph showing the attenuation and chirp characteristics of the modulator in FIG. 2.

Experiment shows that the chirp parameter $\alpha$ of a Mach-Zehnder lithium-niobate modulator of the type used in the first embodiment depends on the operating point of the modulator; that is, on the bias voltage. FIG. 13 shows data obtained by the inventor from measurements of both the attenuation characteristic and the chirp characteristic of the Mach-Zehnder modulator 2. For the chirp characteristic, indicated by black data points, the operating point $V_0$ is given in volts on the horizontal axis, and the chirp parameter $\alpha$ on the left vertical axis. For the attenuation characteristic, indicated by white data points, the horizontal axis gives the modulating voltage Vm in volts, and the right vertical axis indicates the power of the optical output signal Po. The Po values are normalized so that the maximum and minimum values are one and zero, respectively.

When the feedback loop in the first embodiment sets the operating point on the positive slope of the attenuation characteristic, the chirp parameter α is positive. At the midpoint of the positive slope of the attenuation characteristic, α is approximately +0.5, a value suitable for use with G.653 fiber in the 1.5-μm wavelength band. When the feedback loop sets the operating point on the negative slope of the attenuation characteristic, α is generally negative. At the midpoint M of the negative slope of the Po curve, α is approximately −0.5, a value suitable for use with G.652 fiber in the 1.5-μm wavelength band.

When the first embodiment is used with G.652 fiber in the 1.5-μm wavelength band, switches 9a and 9b should be set to the position shown in FIG. 1, coupling the divider 7 to the non-inverting input terminal of the operational amplifier 8. The feedback loop then provides negative feedback on the positive slope of the curve shown in FIG. 5, setting the operating point on the negative slope of the attenuation characteristic in FIG. 13. The Mach-Zehnder modulator 2 generates a negative chirp that compensates for the chromatic dispersion produced by the fiber, reducing the dispersion penalty as indicated in FIG. 11. The polarity of the optical output signal Po is reversed from the polarity of the electrical input signal Si.

When the first embodiment is used with G.653 fiber in the 1.5-μm wavelength band, switches 9a and 9b should be set to the opposite position, coupling the divider 7 to the inverting input terminal of the operational amplifier 8. The feedback loop then sets the operating point on the positive slope of the attenuation characteristic in FIG. 13. The Mach-Zehnder modulator 2 generates a positive chirp, giving good transmission results as indicated in FIG. 12. The polarity of the optical output signal Po matches the polarity of the electrical input signal Si.

The first embodiment enables optical signals to be transmitted through both standard types of single-mode optical fiber in the minimum-loss 1.5-μm wavelength band with relatively little distortion and only a small dispersion penalty. More generally, the first embodiment allows selection of the chirp polarity that produces the least dispersion penalty when optical signals are transmitted through any type of optical fiber, at any wavelength.

In a variation of the first embodiment, the divider 7 is replaced with a circuit that obtains the difference between the outputs of the first and second photodetectors 4 and 5.

In another variation, a low-pass filter is inserted between the divider 7 and switch 9, to ensure that the signal received by the operational amplifier 8 reflects the average output power of the Mach-Zehnder modulator 2.

Next, a second embodiment will be described.

Figure 14:
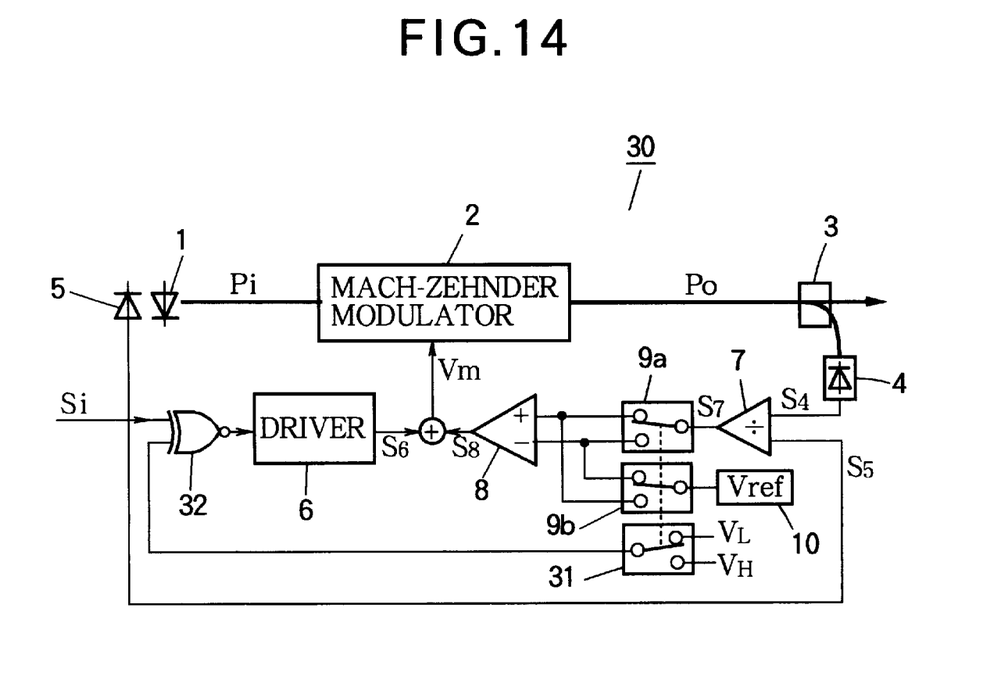
FIG. 14 is a schematic diagram of an optical transmitter illustrating a second embodiment of the invention.

Referring to FIG. 14, the second embodiment is an optical transmitter 30 combining the elements of the first embodiment with an additional switch 31 and an exclusive-NOR gate 32. Switch 31 is ganged with switches 9a and 9b to produce a control signal with a low logic level ($V_L$) when the divider 7 is coupled to the non-inverting input terminal of the operational amplifier 8, and a high logic level ($V_H$) when the divider 7 is coupled to the inverting input terminal of the operational amplifier 8. The exclusive-NOR gate 32 receives this control signal and the electrical input signal Si. The driver circuit 6 receives the output of the exclusive-NOR gate 32, instead of receiving Si directly.

The exclusive-NOR gate 32 processes the electrical input signal Si according to the control signal received from switch 31, inverting Si when the control signal is low, and leaving Si unchanged when the control signal is high. The exclusive-NOR gate 32 accordingly inverts Si when the divider 7 is coupled to the non-inverting input terminal of the operational amplifier 8 and the optical output signal Po is inverted, and leaves Si unchanged the divider 7 is coupled to the inverting input terminal of the operational amplifier 8 and the optical output signal Po is not inverted. In this way, the exclusive-NOR gate 32 compensates for the reversal of polarity of the optical output signal Po in the first embodiment, so that the polarity of the optical output signal Po always matches the polarity of the electrical input signal Si.

In all other regards, the second embodiment operates in the same way as the first embodiment.

In a variation of the second embodiment, the exclusive-NOR gate 32 is replaced by an exclusive-OR gate, and the high and low outputs of switch 31 are reversed. The same effect is obtained.

In another variation, the exclusive-NOR gate 32 is replaced by a data selector, or by any other input logic circuit that inverts the signal $S_6$ output by the driver circuit 6 when the divider 7 is coupled to the non-inverting input terminal of the operational amplifier 8.

Next, a third embodiment will be described.

Figure 15:
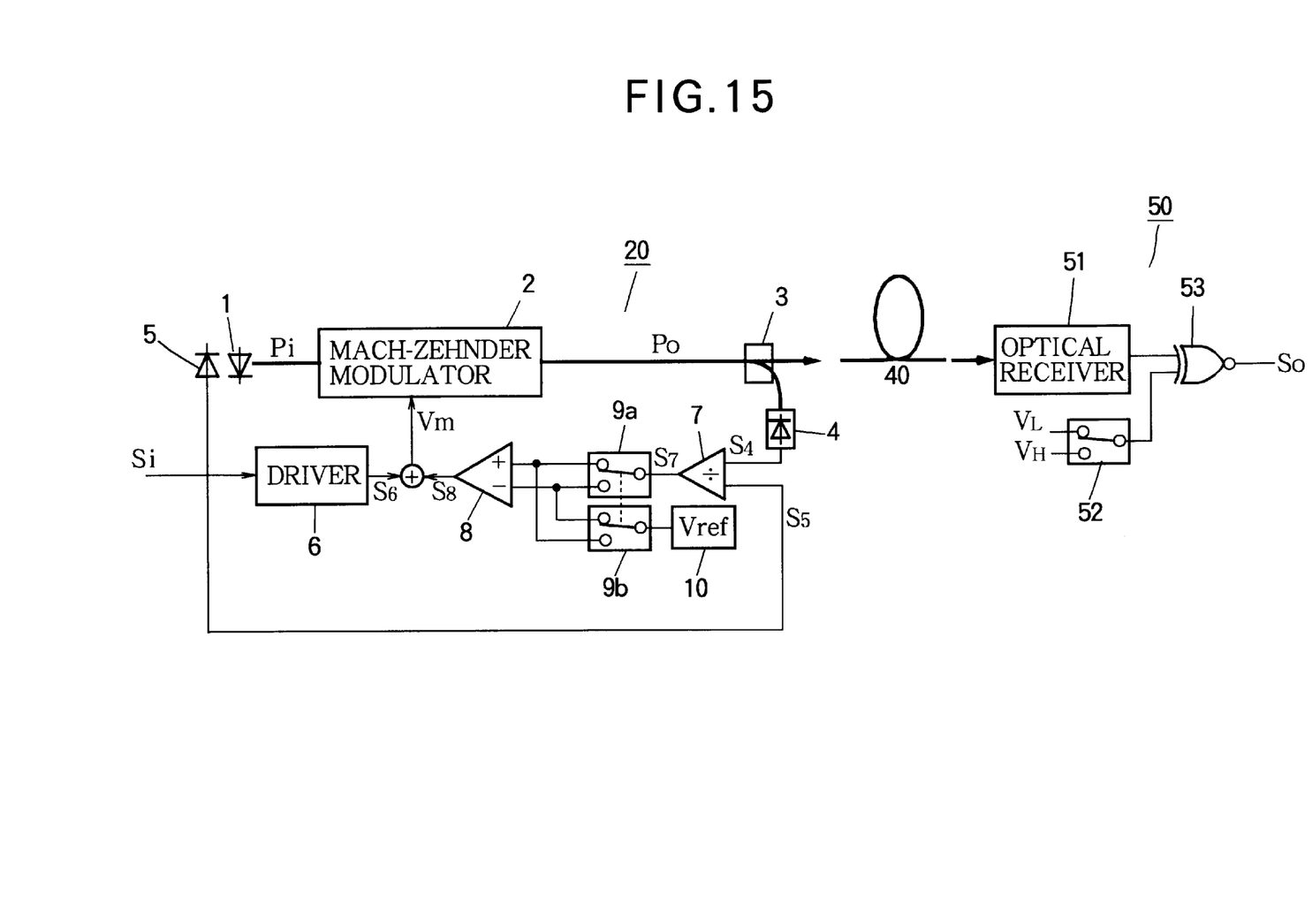
FIG. 15 is a schematic diagram of an optical transmission system illustrating a third embodiment of the invention.

Referring to FIG. 15, the third embodiment is an optical transmission system employing the optical transmitter 20 of the first embodiment. The optical signal output by the optical transmitter 20 is transmitted through an optical fiber 40 to a receiving apparatus 50 comprising an optical receiver 51 that converts the received optical signal to an electrical output signal, a switch 52, and an exclusive-NOR gate 53.

Switch 52 generates an output signal with a high ($V_H$) or low ($V_L$) logic level. This signal is combined with the output of the optical receiver 51 by the exclusive-NOR gate 53 to produce the final output signal So of the receiving apparatus 50. The polarity of the final output signal So is reversed when the output of switch 52 is low, and is left unchanged when the output of switch 52 is high.

The switch 52 in the receiving apparatus 50 is set according to the setting of switches 9a and 9b in the optical transmitter 20. At the settings shown in FIG. 15, since the divider 7 is coupled to the non-inverting input terminal of the operational amplifier 8, the polarity of the signal Po output by the Mach-Zehnder modulator 2 is reversed, but since the output of switch 52 is low, the polarity is reversed again by NOR gate 53, so the polarity of the final output signal So matches the polarity of the electrical input signal Si. If the setting of switches 9a and 9b is reversed, then the setting of switch 52 is also reversed, so that Si, Po, and So all have the same polarity.

Switches 9, 10, and 52 can be set manually when the transmission system is installed. Alternatively, switches 9, 10, and 52 can be controlled by system supervisory equipment (not visible), according to the transmission wavelength, for example. The switch settings can also be changed as necessary when additional components such as optical amplifiers are added to the system.

The third embodiment provides an optical transmission system that compensates for DC drift in the Mach-Zehnder modulator 2, selects the chirp polarity that produces the least dispersion penalty, and assures that the final output signal So has the same polarity as the electrical input signal Si, regardless of which chirp polarity is selected.

In a variation of the third embodiment, the exclusive-NOR gate 53 is replaced by an exclusive-OR gate, and the setting of switch 52 is reversed. The same effect is obtained. More generally, the switch 52 and exclusive-NOR gate 53 can be replaced by any output logic circuit that inverts the polarity of the final output signal So.

In another variation of the third embodiment, the optical transmitter 30 of the second embodiment is used, and the switch 52 and exclusive-NOR gate 53 are eliminated from the receiving apparatus.

Applications of the invention are not limited to long-haul transmission in telecommunication systems. The invention is also useful in subscriber network systems and other optical communication systems. The invention is particularly useful in systems in which the system configuration is likely to be changed, e.g. to accommodate future increases in traffic.

Several variations of the above embodiments have already been mentioned, but those skilled in the art will recognize that further variations are possible within the scope claimed below.

What is claimed is:

1. An optical transmitter for generating a modulated optical signal from an electrical input signal, the optical transmitter comprising:

a light source generating an unmodulated optical signal;

a Mach-Zehnder modulator, coupled to said light source, modulating said unmodulated optical signal according to a driving signal and a bias voltage, thereby generating a modulated optical signal with chirp, said Mach-Zehnder modulator having an attenuation characteristic with DC drift, said chirp having a polarity that depends on said bias voltage;

a driver circuit, coupled to said Mach-Zehnder modulator, generating said driving signal from said electrical input signal;

a first photodetector, coupled to said Mach-Zehnder modulator, monitoring average power of said modulated optical signal;

a second photodetector, coupled to said light source, monitoring power of said unmodulated optical signal;

a feedback circuit, coupled to said Mach-Zehnder modulator, generating said bias voltage, compensating for said DC drift by adjusting said bias voltage, operating in a first mode and a second mode, in the first mode increasing said bias voltage when the average power of said modulated signal increases in relation to the power of said unmodulated signal, in the second mode decreasing the bias voltage when the average power of said modulated signal increases in relation to the power of said unmodulated signal; and a switching circuit, coupled to said feedback circuit, switching the feedback circuit between the first mode and the second mode, thereby switching the polarity of said chirp.

2. The optical transmitter of claim 1, wherein said feedback circuit comprises:

a reference generator generating a reference signal;

a comparison circuit generating a feedback signal by comparing the average power of said modulated signal to the power of said unmodulated signal; and an operational amplifier generating said bias voltage by comparing said feedback signal with said reference signal, having an inverting input terminal to which said switching circuit supplies said reference signal in said first mode and said feedback signal in said second mode, and a non-inverting input terminal to which said switching circuit supplies said feedback signal in said first mode and said reference signal in said second mode.

3. The optical transmitter of claim 2, wherein said comparison circuit divides the average power of said modulated signal by the power of said unmodulated signal.

4. The optical transmitter of claim 2, wherein said comparison circuit takes a difference between the average power of said modulated signal and the power of said unmodulated signal.

5. The optical transmitter of claim 1, wherein said Mach-Zehnder modulator has a lithium niobate substrate.

6. An optical communication system, comprising:

the optical transmitter of claim 1;

an optical receiver converting said modulated optical signal to an electrical output signal; and an optical fiber coupling said optical transmitter to said optical receiver.

7. The optical communication system of claim 6, further comprising an output logic circuit inverting said electrical output signal when said feedback circuit operates in one of said first mode and said second mode.

8. The optical communication system of claim 7, wherein said output logic circuit comprises an exclusive-NOR gate.

9. The optical communication system of claim 7, wherein said output logic circuit comprises an exclusive-OR gate.

10. The optical transmitter of claim 1, wherein said switching circuit also generates a control signal having one value when said feedback circuit operates in said first mode and another value when said feedback circuit operates in said second mode, and the optical transmitter further comprising:

an input logic circuit inverting said electrical input signal according to said control signal.

11. The optical transmitter of claim 10, wherein said input logic circuit comprises an exclusive-NOR gate.

12. The optical transmitter of claim 10, wherein said input logic circuit comprises an exclusive-OR gate.

13. An optical communication system, comprising:

the optical transmitter of claim 10;

an optical receiver converting said modulated optical signal to an electrical output signal; and an optical fiber coupling said optical transmitter to said optical receiver.

* * * * *